United States Patent Office 2,788,712
Patented Apr. 16, 1957

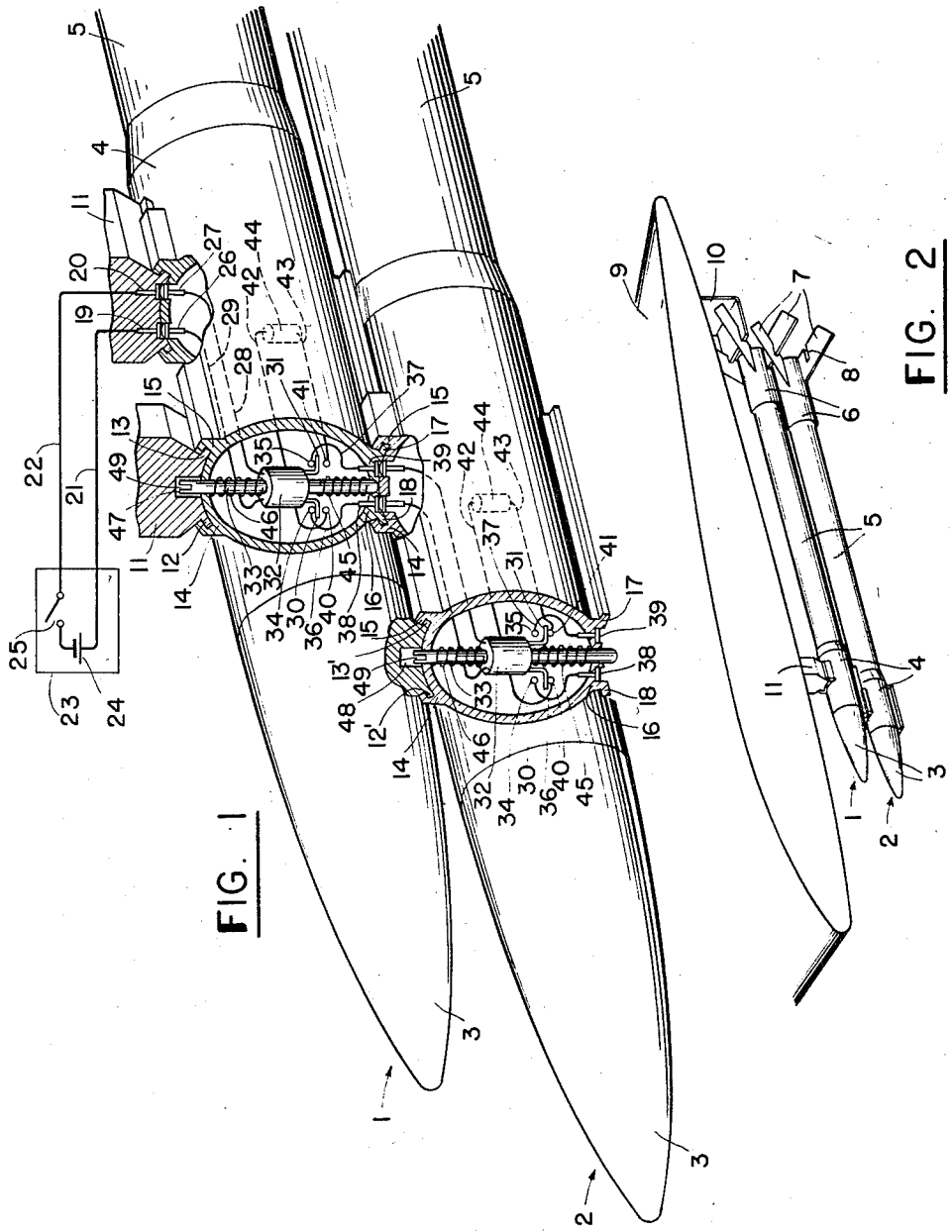

2,788,712

LOCKING ARRANGEMENT FOR SINGLY AND SEQUENTIALLY RELEASING BALLISTIC MISSILES

Nils-Erik Gustaf Küller, Karlskoga, and Karl-John Thorild Thorildsson, Bofors, Sweden, assignors to Aktiebolaget Bofors, Bofors, Sweden, a corporation of Sweden Application July 6, 1955, Serial No. 520,303

Claims priority, application Sweden July 9, 1954

8 Claims. (Cl. 89—1.7)

The present invention relates to a locking arrangement for singly and sequentially releasing a plurality of ballistic missiles, and more particularly ballistic missiles such as rockets or bombs which are suspended in form of a cluster from the wing structure of an aircraft and which are singly and sequentially fired.

Clusters of ballistic missiles of the kind herein referred to such as rockets, are suspended from the wing structure by releasably securing the uppermost rocket to a support mounted on the wing structure and releasably joining the lower rockets to each other. All the rockets in a cluster are disposed in parallel side by side relationship so that the longitudinal center plane of the cluster is at a right angle to the longitudinal axis of the wing and parallel to the longitudinal axis of the fuselage. Each rocket has its own electrically operated firing system, and all the firing systems are connected to a central control station by control circuits arranged to permit single and sequential firing of the rockets, starting with the lowermost rocket.

The electric control system is described and claimed in our co-pending application Serial No. 520,304, filed July 6, 1955, for Letters Patent entitled "Electric Control System For Singly and Sequentially Firing Ballistic Missiles."

Experience and tests have shown that firing of the lowermost rocket and releasing of the same from the cluster tends to pull one or several of the higher and inactive rockets out of the cluster. This entails a corresponding loss in fire power which is obviously highly undesirable.

Accordingly, one of the objects of the present invention is to provide a novel and improved locking arrangement in which all the rockets except the lowermost one are firmly locked together so that the firing of the lowermost rocket cannot pull higher and inactive rockets out of the cluster.

Another object of the invention is to provide a novel and improved locking arrangement in which all the rockets except the lowermost one are firmly locked together and the rocket sequentially next to be fired is automatically unlocked when the lowermost rocket has left the cluster.

Still another object of the invention is to provide a novel and improved locking arrangement in which all the rockets except the lowermost one are firmly locked together and the lowermost rocket is lightly locked to the next higher one to retain the lowermost rocket in its position in the cluster until it is fired without impeding the discharge of the said lowermost rocket from the cluster.

Other and further objects, features and advantages of the invention are pointed out hereinafter and set forth in the appended claims forming part of the application.

In the accompanying drawing a preferred embodiment of the invention is shown by way of illustration and not by way of limitation.

In the drawing:

Fig. 1 is a fragmentary sectional view of a cluster of rockets equipped with a locking arrangement according to the invention, and Fig. 2 is an isometric view of the cluster of rockets according to Fig. 1, shown suspended from the wing of an aircraft.

Referring now to the figures in detail, the cluster of rockets is shown as comprising two rockets, but it may contain initially more than two rockets.

The two rockets 1 and 2 comprise each a war head 3, an intermediate section 4 containing part of the electric control system according to the invention, a motor section 5 housing the propulsion charges, and a nozzle section 6 which includes four guide vanes or fins 7. Each fin has a slot 8. The slots of the upper two fins of each rocket are interlocked with the two lower fins of the next higher rocket of the cluster, and the two upper fins of the uppermost rocket of the cluster engage a bracket 10 suspended from the structure of wing 9. As a result, the rear ends of all the rockets are joined so as to permit a sliding forward movement of the rockets when the same are sequentially fired. The forward end of the uppermost rocket is suspended from the wing structure by means of flanges 12 and 13 formed on a support 11 suitably secured to the wing. Flanges 12 and 13 are in slidable engagement with guide tracks 14 and 15. Each rocket has on its upper side such guide tracks 14 and 15 and on its lower side flanges 12' and 13'. As a result, each rocket can be joined to the next higher rocket, or to the wing structure. The coacting engaging and receiving coupling means thus provided on the rockets and the wing structure retain the entire cluster suspended from the wing. They also permit forward sliding of the rockets, but prevent rearward sliding of the same. It is of course possible and within the scope of the invention to vary the configuration of the coacting coupling means at the front and rear end of the rocket. It is only essential for the purpose of the invention that they permit and prevent respectively the aforesaid movements of the rockets relative to each other and to the wing structure.

The electric control system comprises a central control station 23 which is suitably disposed on the aircraft, generally within the fuselage for operation by a member of the crew.

The control station is diagrammatically shown as comprising a source of current 24 and an operating switch 25. The control station is connected by wires 21 and 22 to contacts 19 and 20 insulated from each other and fitted with blank ends substantially flush in the side of support 11 facing and engaging the uppermost rocket 1. Contacts 19 and 20 are in sliding engagement with contacts 26 and 27 fitted in the upper side of the rocket when rocket 1 is suspended from the wing structure. Contact pairs 19, 20 and 26, 27 may be spring loaded so that reliable engagement is obtained between the coacting contacts. Contacts 26 and 27 are connected to two contact arms 30 and 31 which are mounted insulated from each other in a body 32. This body which may be of insulation material, is fitted upon or constitutes part of a bar 33 which is axially displaceable in a bore extending through the body of the rocket transversely of the longitudinal axis thereof, or in other words transversely of the sliding direction of the rockets when the same are fired.

Contact arms 30 and 31 each coact with a pair of contacts 34, 40 and 35, 41 respectively. Contacts 40 and 41 are connected by wires 42 and 43 to the firing system 44 of the rocket. The firing system should be visualized as being conventional and so arranged that upon supplying current to the same a chain of operations resulting in firing the propulsion charges of the rocket is initiated.

Contacts 34 and 35 are connected by wires 36 and 37 respectively to contacts 38 and 39. These contacts are similar to contacts 19 and 20 and are fitted in the body of the rocket, or more specifically in the part thereof forming coupling flanges 18 and 17. The blank ends of the contacts are substantially flush with the body of the rocket for engagement with contacts 26 and 27 fitted in the upper side of the next lower rocket and leading to contact arms 30 and 31 of the said rocket.

Reverting to body 32 and bar 33 supporting the same, the bar is urged downwardly by an upper loaded spring 46 into the position shown in Fig. 1 for the lower rocket 2, in which the lower end of the bar protrudes from the bottom side of the body of rocket 2. A lower spring 45 limits the downward movement of the bar. In the lower position of the bar contact arms 30, 31 engage contacts 40, 41 leading to firing system 44. The bar of each rocket coacts with the body of the next lower rocket so that it is held by the next lower rocket in its upper position in which contact arms 30 and 31 engage contacts 34 and 35 leading to the respective contacts 38 and 39. The bar of rocket 1 is shown in the upper position. The upper end of the uppermost bar engages a recess 47 in support 11 and the upper end of each lower rocket engages a similar recess 48 in the bottom side of each lower rocket. The tip of each bar is structurally weakened in relation to the remaining part of the bar by any suitable means, for instance by providing a slot 49. The length of bar 33 is such that the strong or non-weakened part of the bar protrudes into the respective recess when the bar is in its upper position (rocket 1), and that the weakened tip only protrudes into the respective recess when the bar is in its lower position (rocket 2), or in other words that the weakened part of the bar is situated within the boundary between the bodies of an upper and a lower rocket or between the body of the uppermost rocket and the body of support 11. As a result, bar 33 in addition to being a switching member constitutes a locking member which in its upper position firmly locks a rocket against a forward sliding movement relative to its support and in its lower position lightly locks each rocket against such sliding movement.

The operation of the locking arrangement as hereinbefore described, is as follows:

Let it be assumed that rockets 1 and 2 are assembled in the positions shown in Figs. 1 and 2. Then, the switching and locking bar 33 of rocket 1 is in its upper or locking position by engagement with the body of rocket 2 and bar 33 of rocket 2 is in its lower or release position due to the action of spring 46 since there is no lower rocket to counterbalance the action of the spring. As a result, rocket 1 is strongly secured against sliding displacement in forward direction whereas rocket 2 is lightly secured to rocket 1. As is evident, the weakened tip of the lower bar can be readily sheared off when the lowermost rocket 2 is fired. Furthermore, control station 23 is connected to the firing system 44 of the lowermost rocket only, the firing system 44 of rocket 1 being disconnected at its contacts 40 and 41. In other words, the intermediate rocket constitutes an electric link between the control station and the lowermost rocket. Consequently, closing of switch 25 in control station 23 can cause firing of the lowermost rocket only. This rocket when moving forwardly by the action of its propulsion gases will shear off the weakened tip of its bar 33. Rocket 1 now becomes the lowermost rocket and accordingly its bar 33 will move into its release position thereby unlocking rocket 1 and connecting contacts 40, 41 to connect the firing system 44 to control station 23.

While as mentioned before, two rockets only are shown to simplify the illustration, any number of rockets may be similarly suspended. Irrespective of the number of rockets in the cluster, the firing system of the lowermost rocket only is connected to the control station and the next higher rocket will be automaticaly armed and unlocked when the lowermost rocket is fired.

While the circuit connections of the control system are all shown as wires it is evident that some of the circuit connections may be formed by the bodies of the rockets proper if the rocket bodies are made of electrically conductive material.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A locking arrangement for singly and sequentially releasing airborne ballistic missiles suspended from the wing structure of an aircraft in form of a depending cluster in which al lthe missiles are joined slidable relative to each other and the uppermost missile is supported by the wing structure slidable relative thereto, said locking arrangement comprising a support for the cluster attachable to the wing structure, a locking member for each missile, each of said locking members being disposed within the missile slidable between a locking position protruding partly from the upper side of the missile and a release position at least partly withdrawn into the body of the missile, said missiles and said support each having a recess positioned to receive the locking member of the next lower missile when said locking member is in its locking position thereby positively locking together all the missiles, and each missile coacting with the locking member of the next higher missile so as to retain the member in its locking position, the locking member of the lowermost missile being free to move into its release position.

2. A locking arrangement according to claim 1, wherein the protruding part of each locking member comprises a full strength portion and a weakened portion at its tip, each of said locking members extending into the respective recess with a full strength portion when in its locking position and with its weakened portion when in its release position for lightly retaining the lowermost missile in its position within the cluster to permit separation of said lowermost missile from the cluster by shearing said weakened portion.

3. A locking arrangement according to claim 2, wherein each missile has a bore through its body substantially transverse of its sliding direction when separated from the cluster, and each locking member is disposed axially slidable within the respective bore and has a length such that it protrudes from the lower side of the respective missile when in its released position, the said missiles being disposed in the cluster in a close spacial relationship in which each missile holds the locking member of the next higher missile in its locking position.

4. A locking arrangement according to claim 3, wherein each of said locking members is substantially bar-shaped and of a length such that in its release position the lower end of the bar protrudes from the lower side of the respective missile and the upper end from the upper side of the respective missile, said upper protruding end being the structurally weakened portion to permit shearing thereof when the respective missile is released from the cluster, and that in the locking position said lower end of the bar is substantially flush with the body of the respective missile and an additional part of the bar protrudes from the upper side of the missile, said additional part of the bar being the full strength portion thereby firmly locking together each two adjacent missiles.

5. A locking arrangement according to claim 4, wherein the end of each member protruding in the released position thereof is formed with a slot to weaken the said end.

6. A locking arrangement according to claim 1, wherein each of said locking members is spring biased into its release position.

7. A locking arrangement according to claim 1 and further comprising receiving and engaging coupling means on the upper and lower side respectively of each missile, said coupling means being slidably engageable with the respective coupling means of the next higher and next lower missile, said recesses being formed in the coupling means on the lower side of each missile.

8. A locking arrangement according to claim 7 for ballistic missiles in form of rockets having a tail fin assembly, wherein said coupling means are provided on the forward part of each rocket for joining said forward parts and the fins of the rockets are slidably engageable for joining the rear parts of the rockets.

No references cited.